J. V. N. DORR.
SETTLING APPARATUS.
APPLICATION FILED FEB. 2, 1920.
1,434,596.
Patented Nov. 7, 1922.
2 SHEETS—SHEET 1.
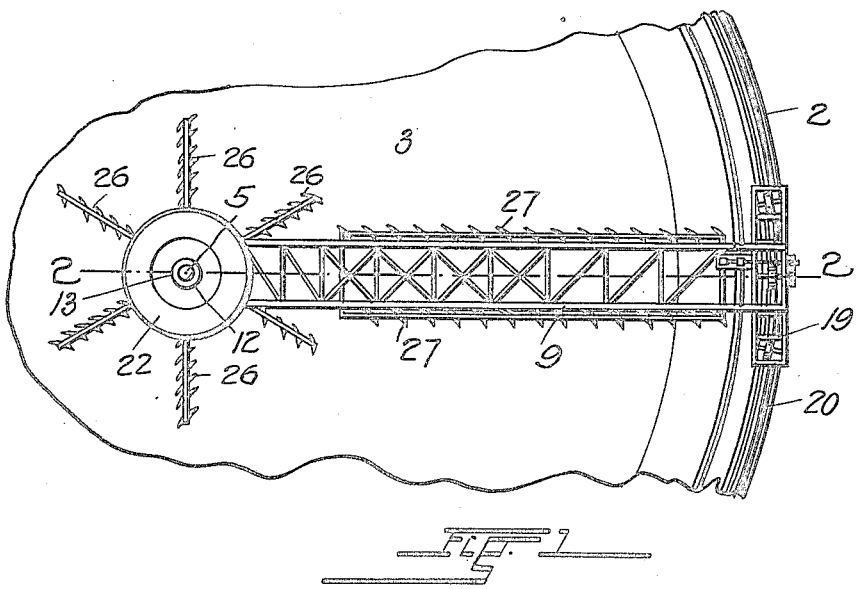
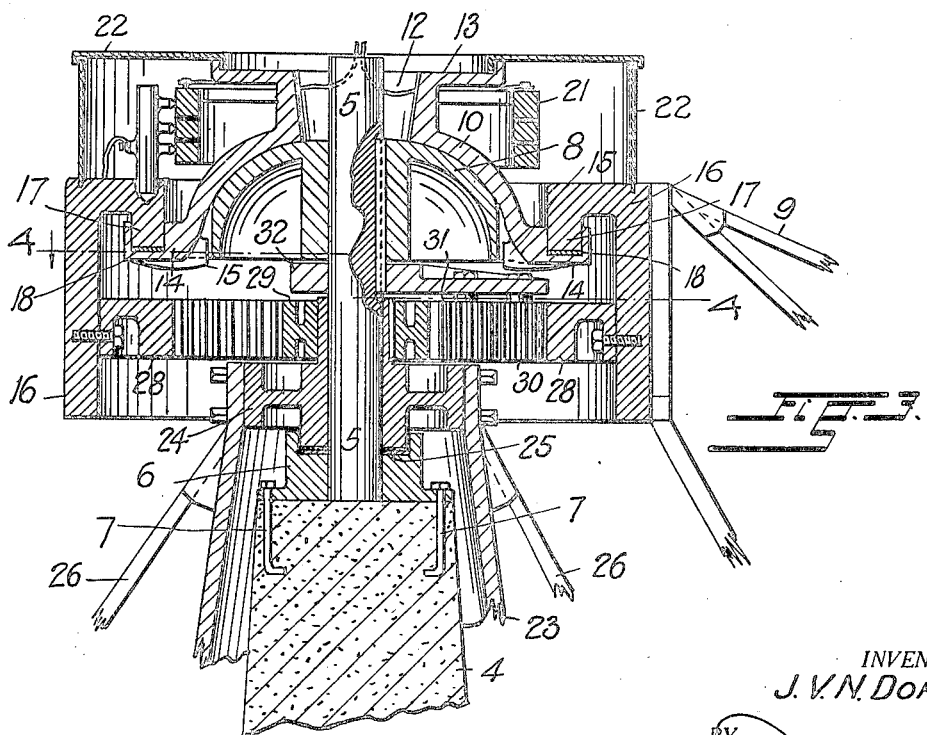
INVENTOR.
J. V. N. DORR.
ATTORNEY.

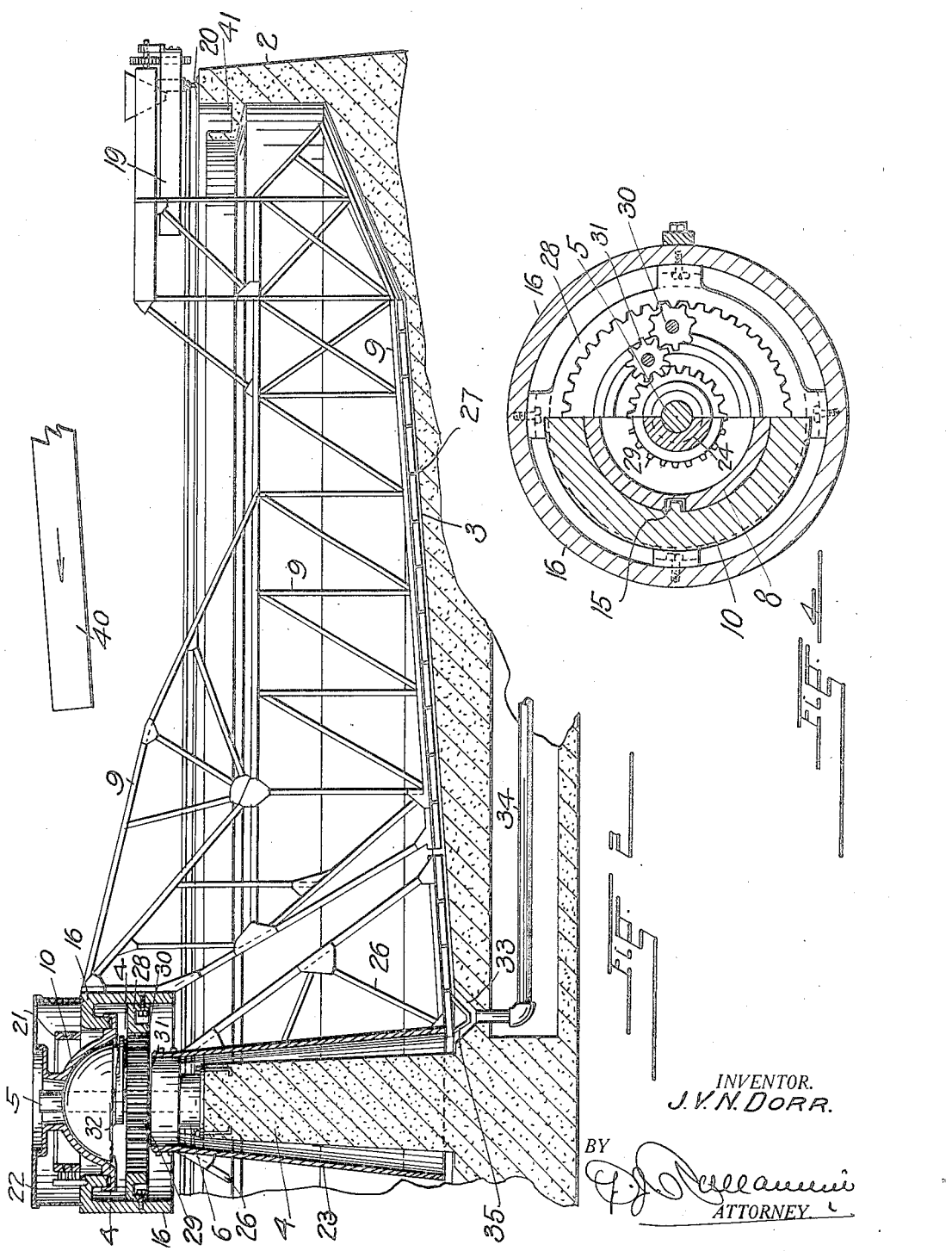

Patented Nov. 7, 1922.

1,434,596

UNITED STATES PATENT OFFICE.

JOHN V. N. DORR, OF NEW CANAAN, CONNECTICUT.

SETTLING APPARATUS.

Application filed February 2, 1920. Serial No. 355,604.

*To all whom it may concern:*

Be it known that I, JOHN V. N. DORR, a citizen of the United States, residing at New Canaan, in the county of Fairfield and State of Connecticut, have invented certain new and useful Improvements in Settling Apparatus, of which the following is a specification.

This application relates to thickeners of the type in which solids settling out of liquid in a cylindrical tank are continuously moved to a central point of discharge by the rotary movement of a suitable scraping element.

The pulp to be thickened by this method of dewatering is usually fed into the central portion of the tank at or near the water level determined by the peripheral overflow and it is natural that, especially in tanks of large diameter, the more rapid settling action adjacent the point of feed and the constant removal of settled matter from the periphery of the tank to the central discharge opening, will cause an accumulation of material in the central portion of the tank gradually diminishing toward the periphery of the same.

It follows that the resistance of the settled matter on the bottom of the vessel to the action of the scraping element which moves it to the central point of discharge, is greater in the central region of the settling surface than at the circumference thereof and that in consequence the movement of the thickened matter to the outlet of the tank is unequable to the extent of preventing the continuous operation of the machine at or near its point of highest efficiency.

It is an object of the present invention to provide in thickening apparatus of the above described character, a scraping element whose impellent capacity is greater in the central region of the settling tank than nearer the periphery thereof whereby to equalize the movement of the thickened matter to the discharge opening over the entire extent of the settling area.

With the above and other objects in view, my invention consists in its preferred form, of the construction, combinations and arrangement of parts illustrated in the accompanying drawings in which—

Figure 1 represents a fragmentary plan view of a thickener to which my invention is applied;

Figure 2, an enlarged vertical section of the apparatus taken on the line 2—2, Figure 1;

Figure 3, an enlarged section through the differential gearing and supporting mechanism of the scraping element, and Figure 4, a section taken on the line 4—4, Figure 3, drawn to a reduced scale.

Referring to the drawings, the reference character 2 designates a circular tank made of cement or other suitable material and having a bottom surface 3 which slopes gently inwardly from its peripheral wall.

A pier 4 erected in the center of the tank provides a support for a solid steel shaft 5 which is rigidly held in an upright position in a step 6 secured to the pier by anchored bolts 7.

Rigidly keyed to the shaft adjacent its upper end, is a hollow spherical head 8 which constitutes the male member of a ball-and-socket joint for the support of a trussed sweep 9 by which the scraping element is driven in the operation of the machine.

The head supports a correspondingly socketed bearing 10 which has an opening 12 for the free passage of the upper portion of the shaft, and upper and lower flanges 13 and 14 the latter of which supports the inner end of the sweep.

Lugs 15 on the bearing loosely extending in peripheral recesses of the head, hold the bearing against rotation without interfering with its self-adjusting motion.

The sweep hereinbefore referred to, extends radially along the bottom surface of the tank in rigid connection with a hollow cylindrical hub 16 which is supported on the bearing 10.

The hub has to this end an interior, downwardly projecting rim 17 which rests upon a fiber lining 18 at the bottom of a correspondingly formed depression in the lower flange of the head.

The sweep is rigidly secured to its hub and its outer end is attached to a self-propelling wheeled carriage 19 which moves upon a circular track 20 on the peripheral wall of the tank.

The carriage may receive its motive power from any suitable source, but it is preferably provided with an electric motor which is connected in a circuit through the medium of a contact device 21 mounted on the bearing 10 and enclosed in a dust-proof casing 22 supported on the upper flange thereof.

A mantle 23 widely spaced from the circumferential surface of the pier, has at its upper end a hub 24 which loosely surrounds the shaft 5 and which rests upon a pair of fiber washers 25 at the bottom of a socket in the upper end of the step in which the shaft is supported.

The mantle provides a support for a plurality of arms 26 which extend radially above the central portion of the bottom surface of the tank and are each equipped with a series of transversely slanting scraper blades.

The lower part of the sweep extends along the bottom surface of the tank between the region covered by the scraper arms in their rotary motion, and the periphery of the surface and it is equipped with series of scrapers 27 similar to the others.

The central scraping arms and the scraper-carrying portion of the sweep thus constitute two separate units of the scraping element which in the operation of the apparatus rotate at different angular velocities.

The support for the arms 26 rotatably suspended from the step at the top of the pier, is rotated at a velocity exceeding that of the rotating sweep, by means of a differential gearing.

This gearing comprises an internal driving gear 28 bolted on the inside of the hub of the sweep, a driven gear 29 of smaller diameter fixed on the hub of the support for the scraper arms 26, and a pair of intermediate idler pinions 30 and 31 which conjointly convert the rotary movement of the driving gear into a correspondingly reduced movement of the driven gear in the same direction. The pinions are rotatably suspended from an arm 32 which is keyed to the shaft 5.

In the operation of the apparatus the pulp is fed from a superposed launder 40 into the central portion of the tank in which the solids settle out of the liquid which overflows into a peripheral launder 41. The sweep is moved about its axis of rotation by the movement of the carriage along the circular track, and by the action of its scrapers upon the settled matter on the bottom of the tank, causes it to move toward the center thereof.

The gearing between the hub of the sweep and that of the series of scraper arms, causes the latter to rotate simultaneously at a considerably increased angular velocity, with the result that the material settling in the central region of the tank is subjected to a more rapid impellent action than that nearer the periphery of the tank.

The differential movements of the two separate units of the scraping element compensate for the difference in the density of subsiding matter at different distances from the point at which the material is fed into the tank and the action of the element upon the unevenly settled matter is in consequence equalized over the entire settling area.

The thickened pulp impelled toward the center of the tank, is received in an annular depression 33 from which it is discharged through a conduit 34, and scraper blades 35 on the arm 26, extending into the depression, prevent the accumulation of pulp therein and promote the continuous discharge through the conduit.

The ball-and-socket connection between the bearing of the sweep and the central support provides for a limited automatic adjustment of the sweep to compensate for irregularities in the track along which it has its movement.

It will be understood that although the improvements as shown and described are particularly adapted for use in a thickener of the type in which the scraping element is rotated through the medium of a radial sweep supported upon a circular track at the periphery of the settling tank, the invention is also applicable to thickeners having a central drive, and that variations in the details of construction and the arrangement of the parts of the mechanism by which the two units of the scraping element are mounted for rotation about a common axis and connected to move at different velocities, may be resorted to within the spirit of my invention as defined in the following claims:

It will furthermore be understood that although I have shown and described my invention as applied to a settling vessel having a central or comparatively central feed, it may be found useful in connection with vessels into which the material is fed at or near the periphery.

It is selfevident that such a condition would necessitate an arrangement of the parts of the raking mechanism differing from that herein shown and described, but inasmuch as the cooperative relation of the parts would remain the same and every required change would come well within the spirit of my invention, further illustration or more detailed description are not deemed necessary.

What I claim and desire to secure by Letters Patent is:

1. A settling vessel having a settling surface beneath a determined liquid level, a pier in the center of said surface and an outlet for the discharge of settled matter at the foot of said pier, scrapers rotatably mounted on said pier to move respectively over concentric regions of said settling surface, an internal gear wheel on the outer scraper, an external gear-wheel on the inner scraper, intermediate gearing between said two gear-wheels, and driving means for the rotation of the outer scraper.

2. A settling vessel having a settling surface beneath a determined liquid level, a pier in the center of said surface and an outlet for the discharge of settled matter at the foot of said pier, scrapers rotatably mounted on said pier to move respectively over concentric regions of said settling surface, driving mechanism for the rotation of the outer scraper, at the periphery of the vessel, and differential gearing to transmit the movement of said outer scraper, to the inner scraper at an increased velocity.

3. A settling vessel having a settling surface beneath a determined liquid level, a pier in the center of said surface and an outlet for the discharge of settled matter at the foot of said pier, rotary scrapers mounted on the pier to move respectively over concentric regions of said settling surface, and mechanism for the simultaneous rotation of the two scrapers at relatively different velocities.

In testimony whereof I have affixed my signature.

JOHN V. N. DORR.